US012785814B2

(12) United States Patent
Tremblay et al.

(10) Patent No.: US 12,785,814 B2
(45) Date of Patent: Nov. 3, 2026

(54) DIFFERENTIAL ELECTRO-ABSORPTION MODULATOR SYSTEMS

(71) Applicant: ElectroPhotonic-IC Inc., Kanata (CA)

(72) Inventors: Francois Tremblay, Gatineau (CA); Steven Porter, Ottawa (CA)

(73) Assignee: ElectroPhotonic-IC Inc., Kanata (CA)

( * ) Notice: Subject to any disclaimer, the term of this patent is extended or adjusted under 35 U.S.C. 154(b) by 0 days.

(21) Appl. No.: 19/463,429

(22) Filed: Jan. 29, 2026

(65) Prior Publication Data

US 2026/0230189 A1 Aug. 6, 2026

Related U.S. Application Data

(60) Provisional application No. 63/754,106, filed on Feb. 5, 2025.

(51) Int. Cl.
*H04B 10/50* (2013.01)
*H04B 10/60* (2013.01)

(52) U.S. Cl.
CPC ......... *H04B 10/5053* (2013.01); *H04B 10/60* (2013.01)

(58) Field of Classification Search
None
See application file for complete search history.

(56) References Cited

U.S. PATENT DOCUMENTS

2024/0421909 A1 12/2024 Hjartarson et al.
2024/0421913 A1 12/2024 Tarof et al.
2025/0321439 A1* 10/2025 Zhang .................. G02F 1/0123

FOREIGN PATENT DOCUMENTS

WO 2021097560 A1 5/2021

* cited by examiner

*Primary Examiner* — David W Lambert
(74) *Attorney, Agent, or Firm* — Miltons IP/p.i.

(57) ABSTRACT

An electro-photonic integrated circuit comprising: an electro-absorption modulator (EAM); and a signal driver and bias circuit; wherein the EAM comprises a first EAM portion configured for generating a first modulated optical output signal from an optical input signal; and a second EAM portion configured to be optically coupled to the first EAM portion and configured to receive the first modulated optical output signal and output a second modulated output signal; wherein the first EAM portion and second EAM portion are each configured to receive a respective substantially out of phase differential signal, from the signal driver and bias circuit, to generate substantially in-phase modulation in the EAM.

29 Claims, 9 Drawing Sheets

DIFFERENTIAL ELECTRO-ABSORPTION MODULATOR SYSTEMS

CROSS-REFERENCE TO RELATED APPLICATION(S)

This application claims the benefit of and is related to U.S. provisional patent application 63/754,106 filed Feb. 5, 2025; entitled "DIFFERENTIAL ELECTRO-ABSORPTION MODULATOR SYSTEMS", which is incorporated by reference in its entirety.

FIELD OF THE INVENTION

The present disclosure relates generally to integrated electro-photonic transmitter and receiver systems, and more particularly to an electro-absorption modulator (EAM) module and the driving thereof.

BRIEF SUMMARY

The present disclosure addresses an improved integrated electro-absorption modulator (EAM) module circuit structure which is configured to be differentially driven and which enables reduction in radiation, cross-talk and power dissipation, while improving performance (bandwidth S21 and reflection S11) and reducing size and power requirements. In some aspects, a dual modulator of two portions is differentially driven between reference voltages o, each portion responsible for providing a contribution to the total amount of the modulation imparted to a modulated optical signal.

According to an aspect of the present invention there is provided an electro-photonic integrated circuit comprising: an electro-absorption modulator (EAM); and a signal driver and bias circuit; wherein the EAM comprises a first EAM portion configured for generating a first modulated optical output signal from an optical input signal; and a second EAM portion configured to be optically coupled to the first EAM portion and configured to receive the first modulated optical output signal and output a second modulated output signal; wherein the first EAM portion and second EAM portion are each configured to receive a respective substantially out of phase differential signal, from the signal driver and bias circuit, to generate substantially in-phase modulation in the EAM.

In an aspect, the first EAM portion is configured to provide a first modulation to the optical input signal and the second EAM portion is configured to provide a second modulation to the modulated optical output signal to generate the second modulated output signal having the first modulation and second modulation.

In an aspect, the optical input signal is provided by one of an on-chip laser forming part of an electro-absorption modulated laser (EML), another modulator, an off-chip optical source and a fiber bearing an optical input from elsewhere.

In an aspect, each of the first EAM portion or the second EAM portion is provided with a bias voltage which provides an operating point for absorption in the EAM portion. In an aspect, wherein the bias voltage is provided on one of a p-contact or an n-contact of each of the first EAM portion and the second EAM portion and the respective out of phase differential signal is provided on an opposite contact of each respective ones of the first EAM portion and the second EAM portion.

In an aspect, the first EAM portion comprises a first PIN waveguide structure and the second EAM portion comprises a second PIN waveguide structure, one of which is arranged as p-up and the other as n-up.

In an aspect, the first EAM portion connected to a first reference voltage (Vbias) at an n-contact; and to Vin via a capacitor and to a second reference voltage (Vgrd) via a resistor at a p-contact.

In an aspect, further comprising a second capacitor between Vin and the second reference voltage.

In an aspect, the second EAM portion is connected at an n-contact to Vin via a third capacitor and a first reference voltage via a second resistor; at a p-contact is connected to second reference voltage via a fourth capacitor.

In an aspect, the first EAM portion and the second EAM portion are arranged in series relative to Vin.

In an aspect, the first EAM portion and the second EAM portion are arranged in parallel relative to Vin.

In an aspect, the first EAM portion and the second EAM portion are arranged in parallel relative to Vin.

In an aspect, further including a gain element to restore electrical asymmetry.

In an aspect, the first EAM portion and the second EAM portion are configured to have substantially a same length.

In an aspect, the first EAM portion and the second EAM portion are configured to receive substantially the same value of Vin, one positive and one negative.

In an aspect, Vin and −Vin are respectively applied across the first EAM portion and the second EAM portion.

In an aspect, Vin and −Vin comprise time-varying modulation signals for the respective first EAM portion and second EAM portion.

In an aspect, further comprising a delay element to configure a propagation delay of optical signals between modulation thereof in the first EAM portion and subsequent modulation thereof in the second EAM portion to equalize outputs therefrom.

In an aspect, further comprising a high frequency (HF) capacitor coupled between a first and a second reference voltage to provide a local source of charge to mitigate edge current.

In an aspect, the electro-absorption modulator (EAM); and the signal driver and bias circuit are monolithically integrated on a single chip.

In an aspect, wherein the single chip comprises a plurality of epitaxial stack formed horizontally over one another.

In an aspect, further comprising connection to an optical fiber for onward transmission.

According to a second aspect of the present invention there is provided a driver arrangement for driving an electro-absorption modulator (EAM) comprising a first EAM portion and a second EAM portion wherein the drive arrangement comprises a driver and a bias circuit configured to output a respective substantially out of phase differential signal to each EAM portion to cause the first and second EAM portions to generate a substantially in-phase modulation.

In an aspect, providing a bias voltage from the diver arrangement to each EAM portion which provides an operating point for absorption in the EAM portion.

In an aspect, the bias voltage is provided on one of a p-contact or an n-contact of each of the first EAM portion and the second EAM portion and the respective out of phase differential signal is provided on an opposite contact of each respective one of the first EAM portion and the second EAM portion.

According to a third aspect of the present invention there is provided an electro-absorption modulator (EAM) comprising a first EAM portion configured to receive an optical input signal and output a first modulated optical output signal; and a second EAM portion configured to be optically coupled to the first EAM portion and configured receive the first modulated optical output signal and to output a second modulated optical output signal; wherein the first EAM portion and second EAM portion are configured to receive a respective out of phase differential signal which is biased to produce in-phase modulation from a driver arrangement according another aspect.

In an aspect, wherein the first EAM portion is configured to provide a first modulation to the optical signal and the second EAM portion is configured to provide a second modulation to the first modulated output to generate the modulated output having the first modulation and second modulation; and In an aspect, the first EAM portion is connected to a first input voltage (Vin) via a first capacitor and to ground (Vgrd), and comprises a first resistor across the first input voltage and a second resistor between ground and the first EAM portion; and wherein the second EAM portion is connected to a bias voltage (2Vbias) and to a second input voltage (−Vin) via a second capacitor and a third resistor is connected between the bias voltage and to the second input voltage; the bias voltages is connected to fourth resistor and to ground via a third capacitor.

According to a third aspect of the present invention there is provided a transmitter comprising the electro-photonic integrated circuit of first aspect.

According to a third aspect of the present invention there is provided an optical communication system comprising one or more transmitter according to a third aspect and a plurality of receivers configured to receive a modulated optical output from the one or more transmitters via a plurality of fibers or the like.

BRIEF DESCRIPTION OF THE DRAWINGS

The foregoing and other advantages of the disclosure will become apparent upon reading the following detailed description and upon reference to the drawings.

Figure 1A:
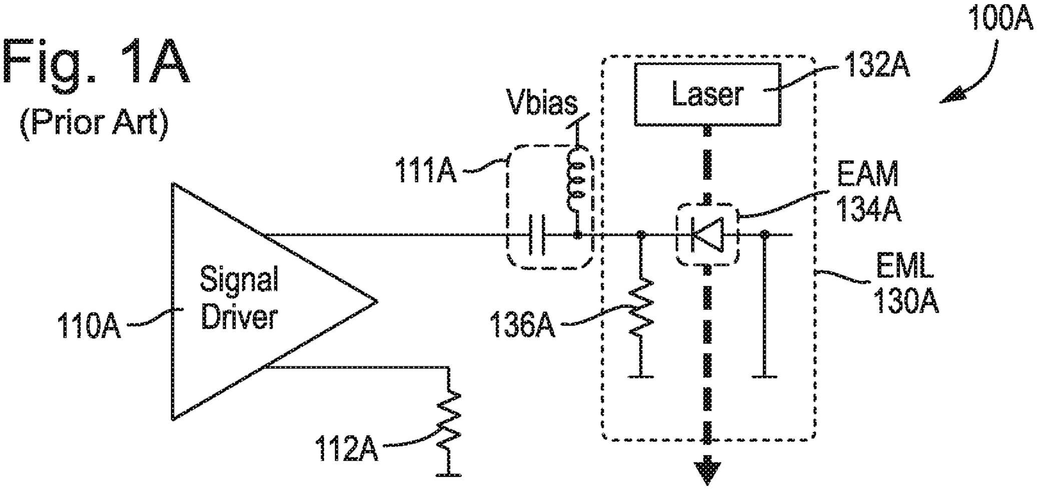
Fig. 1A (Prior Art)
FIG. 1A is a schematic block diagram of a known single ended circuit approach to electro-absorption modulation of optical signals.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the scope of an invention as defined by the appended claims.

DETAILED DESCRIPTION

As noted above, there are a number of known approaches to electro-absorption modulation of optical signals, including the classic single ended approach, a variation thereof, and a differential approach.

FIG. 1A illustrates the classic single ended circuit approach 100A to electro-absorption modulation of optical signals. An integrated electro-absorption modulated laser (EML) 130A includes a laser 132A which generates the optical signal (e.g. a continuous wave optical signal) to be modulated by an electro-absorption modulator (EAM) 134A for output as a modulated optical signal. The EAM 134A is driven by signals from a signal driver 110A and associated circuitry. A first output of the signal driver 110A is coupled to one electrode of the EAM 134A via a DC coupled termination or bias tee 111A, which allows a first reference voltage e.g. Vbias to be applied to the one electrode of the EAM 134A as well as allowing the signal from the signal driver 110A to reach the one electrode of the EAM 134A. The other electrode of the EAM 134A is coupled to a second reference voltage e.g. ground. A resistor 136A formed in the EML 130A is coupled in parallel with the EAM 134A to ground, and a resistor 112A located externally and ideally close to the EML 130A is coupled between the end of the second output of the signal driver 110A and ground.

The single ended circuit approach 100A suffers from power dissipation in the termination (e.g. in some contexts 60-80 mW). Furthermore, the single ended configuration suffers from radiation and crosstalk of the signal as it is inherently unbalanced even though the second output of the signal driver 110A ideally terminates close to the EML 130A. Furthermore, any common mode noise coming from a differential signal does not get rejected.

Figure 1B:
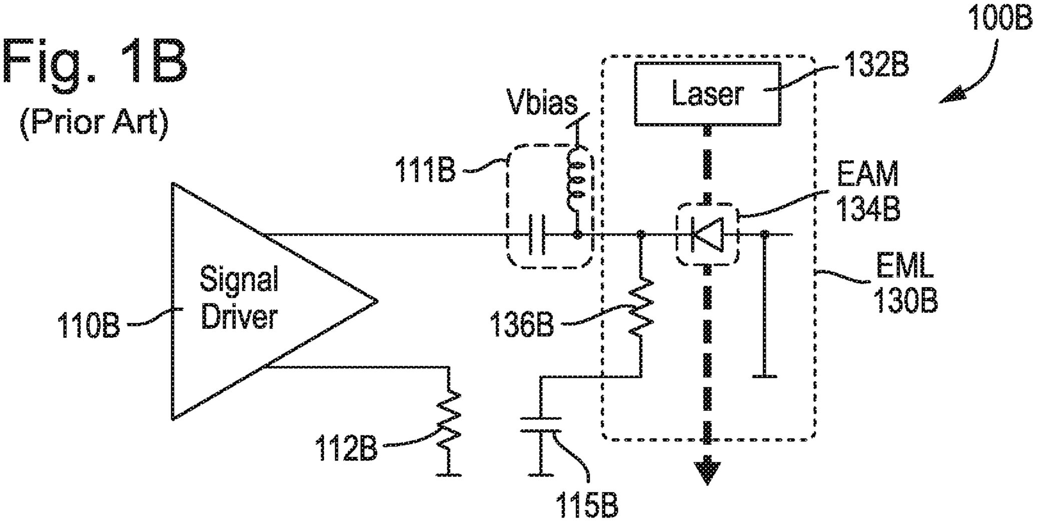
Fig. 1B (Prior Art)
FIG. 1B is a schematic block diagram of a further known single ended circuit approach to electro-absorption modulation.

In a variation of 100A of FIG. 1A, FIG. 1B illustrates a second single ended circuit approach 100B to electro-absorption modulation of optical signals, including AC termination. The EML 130B includes a laser 132B which generates the optical signal (e.g. a continuous wave optical signal) to be modulated by an EAM 134B for output as the modulated optical signal. The EAM 134B is driven by signals from the signal driver 110B and associated circuitry. The first output of the signal driver 110B is coupled to one electrode of the EAM 134B via a DC coupled termination or bias tee 111B, which allows the first reference voltage e.g. Vbias to be applied to the one electrode of the EAM 134B as well as allowing the signal from the signal driver 110B to reach the one electrode of the EAM 134B. The other electrode of the EAM 134B is coupled to a second reference voltage e.g. ground. A resistor 136B formed in the EML 130B is coupled in parallel with the EAM 134B and AC terminated with a capacitor 115B located externally to the EML 130B, for example on a subcarrier of the EML 130B. Another resistor 112B located external and ideally close to the EML 130B is coupled between the end of the second output of the signal driver 110B and ground. It is noted that the terms electrode and terminal as used herein are essentially interchangeable, with electrode meaning the physical object on the chip and terminal being the node where the voltage is defined in a schematic sense.

With the AC coupled termination, this second single ended approach saves power dissipation e.g. the 60-80 mW power dissipated in the approach of FIG. 1A. Although, this single ended configuration still suffers from poor common mode input rejection, radiation and crosstalk of the signal as the configuration is inherently unbalanced, there is some improvement over FIG. 1A in performance on the S11 (Input Reflection Coefficient) parameter.

Figure 1C:
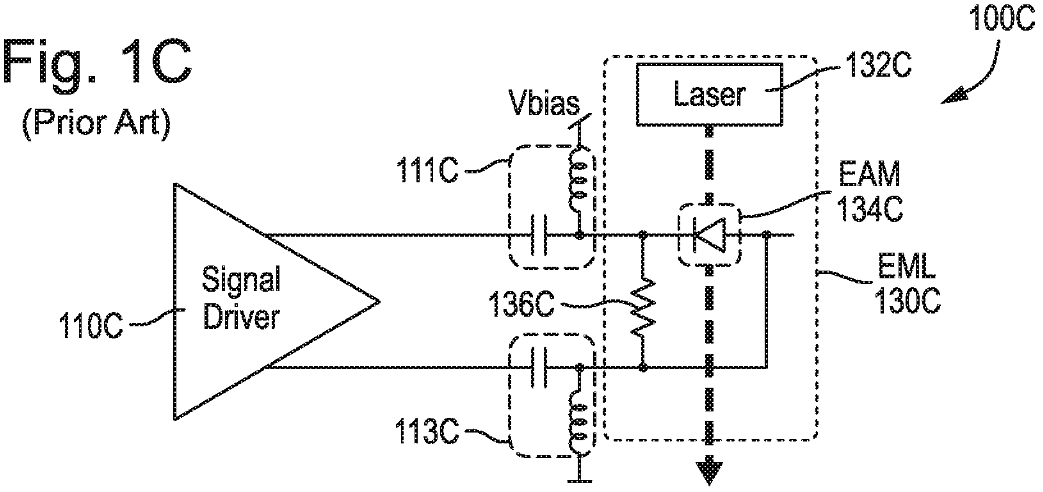
Fig. 1C (Prior Art)
FIG. 1C is a schematic block diagram of a known differential drive circuit approach to electro-absorption modulation.

FIG. 1C illustrates a known differential drive circuit approach 100C to electro-absorption modulation of optical signals. An EML 130C includes a laser 132C which generates the optical signal (e.g. a continuous wave optical signal) to be modulated by an EAM 134C for output as a modulated optical signal. The EAM 134C is driven by signals from a signal driver 110C and associated circuitry. A first output of the signal driver 110C is coupled to one electrode of the EAM 134C via a DC coupled termination or bias tee 111C, which allows a first reference voltage e.g. Vbias to be applied to the one electrode of the EAM 134C as well as a first signal from the signal driver 110C to reach the one electrode of the EAM 134C. A second output of the signal driver 110C is coupled to the other electrode of the EAM 134C via a DC coupled termination or bias tee 113C, which allows a second reference voltage e.g. ground to be applied to the other electrode of the EAM 134C as well as allowing a second signal from the signal driver 110C to reach the one electrode of the EAM 134C. A resistor 136C formed in the EML 130C is coupled across and in parallel with the EAM 134C.

The known differential drive circuit approach 100C does benefit from a differential drive which is inherently balanced, reducing radiation and crosstalk. The configuration, however, does suffer from a non-ideal common mode (CM) impedance, as well as parasitic power dissipation (e.g. in some contexts 60-80 mW).

It should be understood that the foregoing and following electro-photonic implementations may be Indium Phosphide based and co-packaged with silicon-based electronics, however, any other suitable electro-photonic and electronic material-based processes are contemplated by the embodiments which follow.

Figure 2:
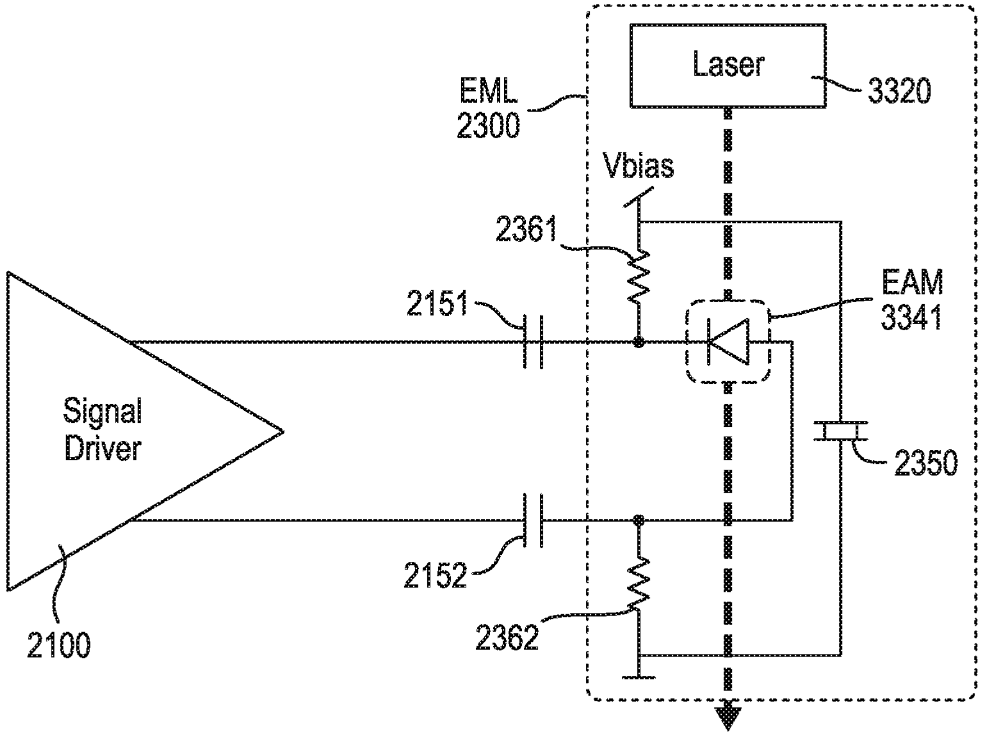
FIG. 2 is a schematic block diagram of a system employing a singular modulator differential drive approach to electro-absorption modulation according to an embodiment.

A system 2000 implementing differential drive electro-absorption modulation according to an embodiment of the present disclosure is illustrated in FIG. 2. An integrated electro-absorption modulated laser (EML) 2300 includes a laser 2320 which generates the optical signal (e.g. a continuous wave optical signal) to be modulated by an electro-absorption modulator (EAM) 2340 for output as a modulated optical signal. The EAM 2340 is driven by signals from a signal driver 2100 and associated circuitry. The signal driver 2100 may include a digital signal processor (DSP) or a clock and data recovery (CDR) circuit or any other kind of signal driving circuit providing the final driving signals to the EAM 2340. A first output of the signal driver 2100 is coupled to one electrode of the EAM 2340 via a first terminating capacitor 2151. A first bias resistor 2361 (also serving as a termination resistor) is coupled between the one electrode of the EAM 2340 and a first reference voltage e.g. Vbias. A second output of the signal driver 2100 is coupled to the other electrode of the EAM 2340 via a second terminating capacitor 2152. A second bias resistor 2362 (also serving as a termination resistor) is coupled between the other electrode of the EAM 2340 and a second reference voltage e.g. ground. In some embodiments the resistances of bias resistors 2361 and 2362 are determined based on transmission line impedance. A high frequency (HF) capacitor 2350 is optionally coupled between the first and second reference voltages e.g. Vbias and ground to provide a local source of charge to deal with edge current, if necessary in the context of the implementation. In some embodiments, one or more of the first and second bias resistors 2361 2362, the Vbias pad, and the HF capacitor 2350 are integrated with the EAM 2340 in the EML 2300. In some embodiments the first and second terminating capacitors 2151 2152 are located exterior to the EML 2300.

Although the EAM 2340 has been illustrated as integrated with the laser 2320 on an EML 2300 coupled to an external signal driver 2100, it should be understood that in some embodiments the EAM 2340 may be integrated with both the signal driver 2100 and the laser 2320 on the same chip, or integrated only with the signal driver 2100 on the same chip optically coupled to an external laser, or integrated with neither the signal driver nor the laser.

The configuration of the system 2000 of FIG. 2 has eliminated the bias tee inductors of the known approaches, which normally take up substantial area, while effectively providing both a differential mode and common mode termination. The signals transmitted by the signal driver over its two outputs are time varying inversely to each other, however, due to the AC coupling from the capacitors, the absolute DC voltage about which the signal varies is inconsequential. The system 2000 exhibits minimal power dissipation, however due to the RC characteristics, the system 2000, as discussed below, is somewhat limited in bandwidth.

The removal of the inductor in FIG. 2 is not necessary if the inherent disadvantages of the inductor are not prejudicial. This may be the case where the is plenty of available space for the inductor, where the bias currents of the EAM are small and so induction losses are lowered and in other circumstances. Thus, the removal thereof is considered optional at least for these use cases and the removal is not essential as shown in some of the examples below.

Figure 3:
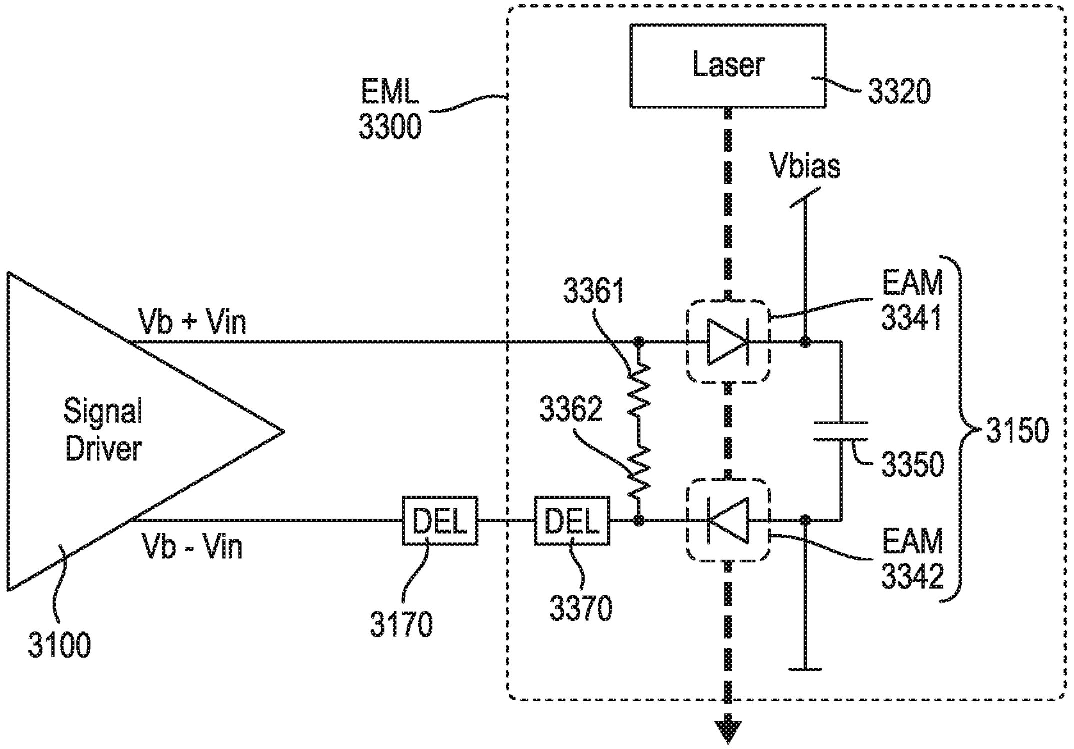
FIG. 3 is a schematic block diagram of a system employing a dual modulator differential drive approach to electro-absorption modulation according to an embodiment.

A system 3000 implementing differential drive electro-absorption modulation according to an embodiment of the present disclosure is illustrated in FIG. 3. The system 3000 is in the form of an electro-photonic integrated circuit (IC) and comprises a number of elements that combine to implement the system 3000. The elements comprise a signal driver 3100 and an EML 3300. In examples these may be monolithically integrated in a single chip or IC or may comprise multiple chips integrated through other connections and coupling. Where the IC is monolithically integrated it may comprise one or more III-V materials, e.g. an InP-based material system, comprising binary, ternary, quaternary and other compositions of In, Ga, As, P, Al and Sb. In an aspect of the invention, some of the elements of the system may be formed from other materials such as Silicon-based, Germanium-based materials or other materials The EML 3300 includes a laser 3320 and an EAM 3150. The laser 3300 generates an optical signal (e.g. a continuous wave optical signal) to be modulated by the EAM. The laser source may be integrated in the EML 3300 or separate therefrom on the same or a different chip. If separate the laser is coupled to the EAM 3150 by appropriate coupling. As such it will be understood that the laser is required to functioning of the system but need not be an integral element of the system.

The EAM 3150 is formed by a waveguide or waveguide material made, in an example, from an epitaxial layer stack, comprising at least a layer of p-type material, a layer of n-type material and an intrinsic i-type layer. The i-layer or i-region is sandwiched between the p- and n-type layers or materials. When provided with an optical signal and driven to operate by the signal driver 3100, the EAM-3150 can generate modulation in the optical signal based on the driving signal voltage level, referred to as Vin. The p-layer includes a p-contact which serves as a first terminal or electrode of the EAM (equivalent to the anode) and the n-layer includes an n-contact which serves as a second terminal or electrode of the EAM (equivalent to the cathode).

The EAM 3150 as described in FIG. 3 comprises first and second portions 3341 3342 arranged in a stacked arrangement as shown, or otherwise as described elsewhere. The first and second portions 3341 and 3342 may be comprised of two separate EAMs having different waveguides or two portions of the same EAM, sharing a waveguide. The EAM is configured to be driven by the signal driver 3100 to receive the optical signal from the laser and modulate this to produce a modulated optical signal. The connections to the EAM are configured to provide a driving signal to control each of the EAM portions 3341 and 3342 in a differential manner. A differential driver as described herein is configured to impart a different input signal to the portions of the EAM. The different input signals are typically (but not always) of equal magnitude and opposite phase (e.g. Vin and −Vin).

The signal driver 3100 may include a digital signal processor (DSP) or a clock and data recovery (CDR) circuit or any other kind of signal driving circuit providing a driving signal to the EAM portions 3341 3342. The driving signal Vin may be the same for each portion of the EAM or different as will be explained further in the alternative configurations herein.

Returning to FIG. 3 a first output of the signal driver 3100 is coupled to one electrode of a first EAM portion 3341. A second output of the signal driver 3100 is coupled to one electrode of a second EAM portion 3342 via one or more optional delay elements 3170 3370. The EAM portions are arranged such that optical signals from the laser 3320 encounter the first EAM portion for modulation prior to encountering the second EAM portion 3342 for further modulation. The other electrode of the first EAM portion 3341 is coupled to a first reference voltage, e.g. Vbias, while the other electrode of the second EAM portion 3342 is coupled to a second reference voltage, e.g. ground (Vgrd).

In alternative configurations than that shown in FIG. 3 there may be differences. The arrangement of the individual IC elements may be rearranged. The voltages applied to the one electrode of the EAMs may be exchanged (Vbias to the second EAM portion and Vgrd to the first EAM portion). The voltages across respective portions of the EAM may be the same or different and this may be determined by the nature of the components in the IC and the signal driving the respective portions. The voltage or voltages applied has an effect on the absorption capabilities of the EAM and thus the nature of the modulation introduced to the incoming optical signal.

A high frequency (HF) capacitor 3350 is optionally coupled between the first and second reference voltages e.g. Vbias and ground to provide a local source of charge to deal with edge current, if necessary in the context of the implementation. Two termination resistors 3361 3362 are coupled in series between the one electrode of the first EAM portion 3341 and the one electrode of the second EAM portion 3342. The termination resistors 3361 3362 serve to terminate transmission from the signal driver as well as provide a complete biasing circuit for the first and second EAM portions 3341 3342. In some embodiments, the resistances of termination resistors 3361 and 3362 are determined based on transmission line impedance. In some embodiments, the termination resistors 3361 3362 are embodied in a single resistor, while in some embodiments they are separated by a mid-point capacitor coupled therebetween or tied to GND directly and using +/−Vbias/2 instead of Vbias and GND.

The EAM portions 3341 3342 are arranged such that the one electrodes of each, coupled to a respective output of the signal driver 3100, are of opposite types, and the other electrodes of each, coupled to a respective reference voltage (Vbias or ground) are of opposite types. For example, in one example embodiment, the first output (Vin) of the signal driver 3100 is coupled to the anode (p-contact) of the first EAM portion 3341 while the second output (−Vin) of the signal driver 3100 is coupled (via optional delay elements) to the cathode (n-contact) of the second EAM portion 3342. In such embodiments, the cathode (n-contact) of the first EAM portion 3341 is coupled to the first reference voltage e.g. Vbias, while the anode (p-contact) of the second EAM portion 3342 is coupled to the second reference voltage e.g. ground (or zero). As described the first and second outputs from the driver have the same magnitude but a different phase i.e. one is 180° out of phase with the other. The values could be reversed and/or the phase difference varied in different configurations as will be evident from the examples herein.

It is clear from FIG. 3, that the total modulation to the optical signal originating from the laser 3320, is a result of the modulation imparted by the first EAM portion 3341 on the optical signal, which is further modulated by the second EAM portion 3342. The modulation imparted by the first EAM portion 3341 on the optical signal, and the further modulation imparted by the second EAM portion 3342 on the optical signal vary in a similar manner, in that whenever the modulation imparted by one EAM portion is increasing or decreasing the modulation imparted by the other EAM portion is also increasing or decreasing The first and second EAM portions 3341 3342 may be substantially the same with each providing substantially the same amount of absorption to optical signals passing therethrough in response to substantially the same voltage difference across the electrodes of the respective EAMs. In such embodiments, an "equal" share of the modulation is provided by each EAM portion regardless of which one acts first and which one acts second.

In general, the EAM portions that provide the same amount of modulation within the active optical waveguide layer are of a similar length along the direction of propagation of the mode within the waveguide. The first and second EAM portions 3341, 3342 may be of unequal lengths or equivalently arranged so as to impart different amounts of absorption when driven by a similar voltage. For example, there may be a 60%-40% (or 40%-60%) "split" of the total modulation between the first and second EAM portions 3341, 3342. The particular "split" may be achieved by the EAM portions 3341, 3342 having appropriately similar or different lengths; by setting an offset reference voltage appropriately relative to the first reference voltage or the second reference voltage; or some combination of employing different lengths, voltages or arrangements. The first and second EAM portions 3341 3342 may be substantially the same lengths, and the offset voltage may be a voltage value substantially halfway between the first reference voltage and the second reference voltage. It should be noted that in FIG. 3, the EAM portions and their spacing are not representative of their actual geometrical proportions, their lengths, relative lengths, position, orientation or spacing therebetween (if any) depending upon the particular electro-photonic implementation of the EAM portions.

By having a 50-50 split EAM the length of each EAM portion is substantially half of the length it would be if not split. This length relates to the size of the i-region in the direction of transmission of light through the EAM and is sometimes referred to as the width of the i-region or active region. This is a primary design consideration for the operation of an EAM. By halving the length of the i-region the light takes less time in the EAM and the speed of operation can potentially double and improve reflection proportionally. Where different proportions of EAM are used there will be some speed advantages but these may not be to the same extent as the 50-50 split. There are other factors of the EAM performance which may be enhanced by judicious management of the materials, size and applied voltages and biases of the EAM portions. This has effects on the nature and types of the voltages needed to drive the EAMs which may lead to further advantages.

The EAM of the present invention comprises optical elements in the form of waveguide materials forming the EAM portions themselves and any optical couplers between the respective EAM portions, the laser input and the modulated output to the fiber. The EAM is configured to have contacts (p-contact and n-contact) which are connected to control and driver circuits formed of electronic elements. The optical elements and the electronic elements may be made from InP-based materials and monolithically integrated. In this case the normal arrangement is two stacks of epitaxial layers one for the optics and one for the electronics. If the EAM is monolithically integrated for many reasons one epitaxial stack is formed horizontally over the other. This may be optic-up or electronics-up as the design case dictates.

In some example the EAM portions may be made from a first material base and the electronics components from another material base. The functionality is similar and the materials enable optimizations of the electronic and optics based on the materials used. For example, an EAM may be InP-based and the other parts of the EML may be Silicon-based or other combinations or materials as will be known to the skilled person. Whatever the combination of materials, they are configured such that the first EAM portion and second EAM portion are configured to receive a respective out of phase differential signal which is biased to produce in-phase attenuation Returning to FIG. 3, a high frequency (HF) capacitor 3350 is optionally coupled between the first and second reference voltages e.g. Vbias and Vgrd to provide a local source of charge to deal with any edge current, if necessary in the context of the implementation. Two termination resistors 3361 3362 are coupled in series between the one electrode of the first EAM portion 3341 and the one electrode of the second EAM portion 3342. The resistors 3361 3362 serve as termination resistors to terminate transmission from the signal driver as well as provide a complete biasing circuit for the first and second EAM portions 3341 3342. In some embodiments, the resistances of termination resistors 3361 and 3362 are determined based on transmission line impedance. In some embodiments, the termination resistors 3361 3362 are embodied in a single resistor, while in some embodiments they are separated by a mid-point capacitor coupled therebetween. In some embodiments, one or more of the two termination resistors 3361 3362, the Vbias pad, and the HF capacitor 3350 are integrated with the EAM 3340 in the EML 3300. The delay elements 3170 3370 may be distributed between the signal driver 3100 exterior to the EML 3300, interior to the EML 3300, or both, and in some embodiments eliminated entirely.

In some embodiments, the amount of delay imparted by the delay elements 3170, 3370 on the second signal from the second output of the signal driver 3100 is substantially equal to the propagation delay of optical signals between modulation thereof in the first EAM portion 3341 and subsequent modulation thereof in the second EAM portion 3342. In some embodiments, particularly those for which the optical delay traversing from the first EAM portion 3341 to the second EAM portion 3342 is not significant, or in embodiments where the geometry and arrangement is such that the lengths of the signal lines from the signal driver already compensate for the delay, use of separate delay elements 3170 3370 may be dispensed with.

Although the EAM portions 3341 3342 have been illustrated as integrated with the laser 3320 on an EML 3300 coupled to an external signal driver 3100, it should be understood that in some embodiments the EAM portions may be integrated with both the signal driver 3100 and the laser 3320 on the same chip, or integrated only with the signal driver 3100 on the same chip optically coupled to an external laser, or integrated with neither the signal driver nor the laser.

The present invention provides a number of alternative schemes by which the EAM portions are driven. In each, an out of phase differential signal is provided to each EAM portion. The phase difference may be 180° or another value. By design, the applied differential signals result in creating in phase attenuation of the output from the EAM portions. In doing this the present invention produces advantages. There is a better signal to noise ratio (SNR) as much of the noise is cancelled out by the differential driving as the respective inputs are out of phase. The IC is able to enable a low bit error rate in high-speed links and as there is less noise the IC is more sensitive. This further gives rise to a lower system power consumption and higher bandwidth operation. Crosstalk is mitigated or removed by the differential aspect. Attenuation in-phase causes a differential based IC to have an improved immunity to noise, improved power efficiency, a more linear responsivity and a higher bandwidth operation capability. By selecting the combination of circuit elements in the IC and the manner in which the EAM is split and driven the present invention provides a considerable advantage over systems known to the Applicant at the date of this application.

In operation, each EAM portion is provided with a bias voltage (Vbias, Vgrd) which sets a baseline or operating point for absorption in the EAM portion and an input voltage (Vin, −Vin) from the driver. The bias voltage may be the same for both EAM portions or may be different. If the bias voltage is different the baseline for absorption in the EAM changes and thus gives rise to different level at which modulation will be caused in each EAM portion. Vin is provided to one EAM portion at a first phase and the other EAM portion at a different phase (generally 180° to the first). Vin is time varying and causes a change in the electric field in the EAM which produces the required modulation of the optical input by changes to the absorption of the i-region. The time variation that produces the modulation has the effect of encoding data onto the optical signal. In simple terms each EAM portion is provided with two voltages in operation. A first voltage Vbias or Vgrd sets the operating point of each EAM portion and a second voltage Vin or −Vin is a time-varying voltage that acts as the modulation signal that drives the change in absorption to encode data.

The configuration of the system 3000 of FIG. 3 provides an alternative to the need for bias tees or bias or terminating capacitors or any other similar externals to the EML 3300. The system 3000 thus exhibits a minimal power dissipation, and due to the favorable RC characteristics, as discussed below has an increase in the bandwidth by virtue of a higher cut-off frequency, as well as a factor of two reduction in load capacitance. Furthermore, S11 (Input Reflection Coefficient) and S21 (Forward Transmission Gain (or Loss)) parameters are improved. It also should be noted that due to its symmetry, net current to virtual ground i.e. Vbias and ground in FIG. 3, is zero. The example of FIG. 3 may be revised to include an inductor or other traditional elements if the addition thereof is not detrimental to a particular design, however this may lead to some of the advantages of the invention being reduced compared to other configurations.

FIG. 3 shows a first example of an implementation of the system 3000 in which the EAM 3150 has a first configuration with associated components. The following figures show a plurality of alternative configurations for the EAM, each includes an example configuration and none are intended to be limiting. Combinations of some or all configurations are intended to be included, even if there is no specific illustrated examples.

Figure 4A:
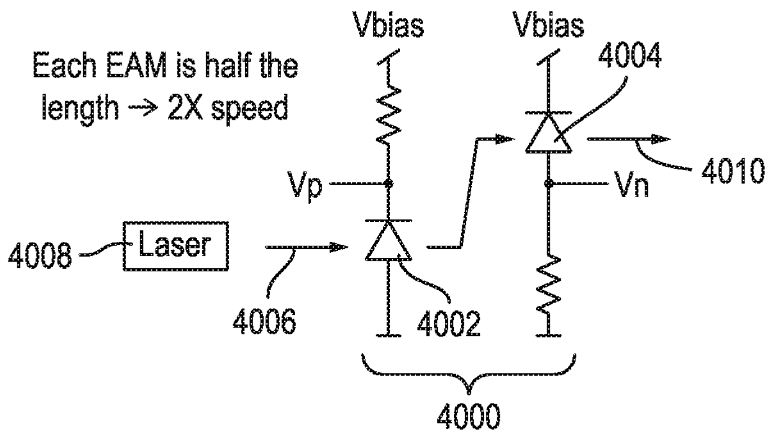
FIG. 4*a* is a simplified representation of the EML in the FIG. 3 example.

FIG. 4*a* is an electrical representation of an EAM 4000 according to an aspect of the invention. The EAM 4000 includes two portions: first EAM portion 4002 and second EAM portion 4004. An optical signal 4006 passes from a laser 4008 through the first EAM portion 4002 and subsequently through the second EAM portion 4004 to generate modulated optical output 4010. There are two voltages applied to the first EAM portion 4002 and two voltages applied to the second EAM portion 4004. Vbias is applied to the p-contact of each EAM: in the case of the first the first EAM portion 4002 via a first resistor and in the case of the second EAM portion 4004 directly. The n-contact of each is connected to ground directly for the first EAM portion 4002 and via a second resistor for the second EAM portion 4004. As a result, both EAM portions 4002, 4004 can receive the same DC bias voltage and due to the resistor location each can experience a different effective bias thereby allowing independent control of the electrical and optical behavior of each portion. The second of the two voltages applied to the EAM portion 4002 and 4004 comprises a voltage input from the driver which is connected to the p-contact for the first portion of the EAM 4002 and the n-contact for the second portion of the EAM 4004. This causes the two EAM portions to experience opposite electric-field swings and therefore opposite modulation responses. This representation is functionally similar to that in FIG. 3 although there are less components providing a similar functionality in this aspect of the invention.

Figure 4B:
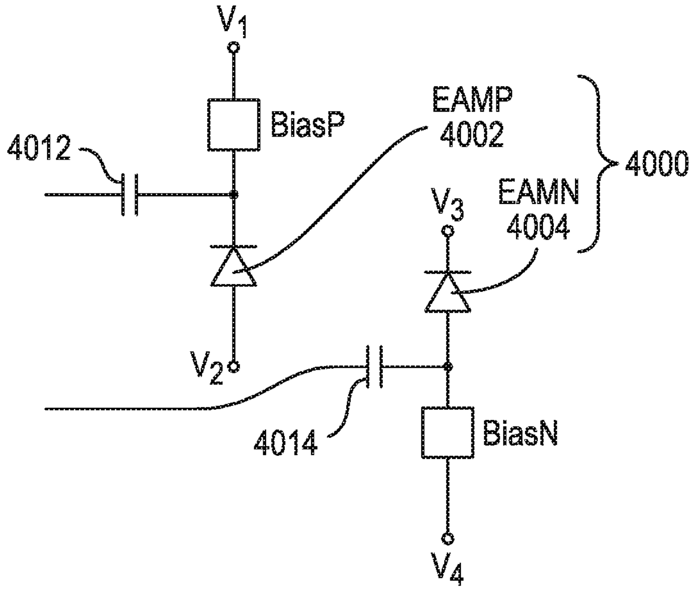
FIG. 4*b* is a further simplified representation of the EML in the FIG. 3 example.

FIG. 4*b* shows a further aspect of the present invention which is the same as that shown in FIG. 4*a* with the exception of additional capacitors 4012 and 4014 on the respective inputs to the first EAM portion and the second EAM portion. The capacitors have the effect of protecting the driver from the EAM's bias voltage, and ensure that only the time-varying modulation signals (Vin and −Vin) are applied across the EAM portions. As mentioned elsewhere these capacitors may be HF capacitors.

FIGS. 5*a* to 5*d* show aspects of the invention which include an inductor. The references refer to like components in FIGS. 5*a* to 5*d* and where not described in detail are equivalent for similar purposes as described elsewhere. Although it is preferred to avoid the use of inductors for the reasons presented above, there may be some circumstances where this is justified. For example, the introduction of an inductor across each EAM portion may provide DC bias continuity while blocking RF interference. In addition, the introduction of the inductor may create resonance to boost bandwidth, stabilize the operating point, and improve RF impedance matching. In certain situations, the addition of the inductor may be justified.

Figure 5A:
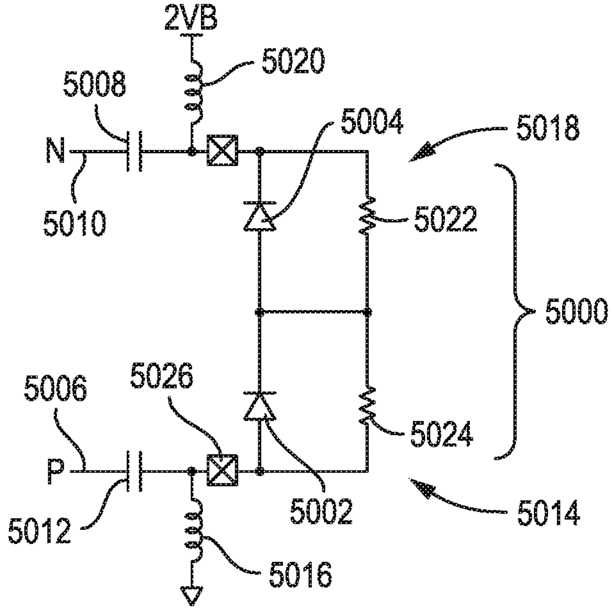
FIG. 5*a* to FIG. 5*d* shows certain alternative configurations of the EML in the FIG. 3 example.

FIG. 5*a* shows a further EAM 5000 having a first EAM portion 5002 and second EAM portion 5004. In this arrangement the EAM portions are connected across the driver in a stacked arrangement. The p-contact of the first EAM portion 5002 being connected to Vin 5006 via a first capacitor 5008 and the n-contact of the second EAM portion 5004 being connected to −Vin 5010 via a second capacitor 5012. One side 5014 of the arrangement is connected to ground via a first inductor 5016 and the second side 5018 to Vbias via a second inductor 5020. Resistors 5022 and 5024 are connected across respective EAM portions 5002 and 5004. Vbias in stacked arrangements such as this, may require a higher voltage (e.g. 2Vbias) as compared to those arranged in a non-stacked arrangement where the value of Vbias is not doubled. The figures include a number of locations 5026 which represent the locations of bond pads or connections which may exist between a die on which the EAM has been formed and any connection to the driver via, a surmount, PCB or whatever. These are representative and could be included or not and be located in different places as required. All examples show how the optical signal from a laser is directed from the first EAM portion to the second or from the second portion of the EAM to the first portion depending on the relative positions and/or polarities of EAM portions in the different arrangements.

Figure 5B:
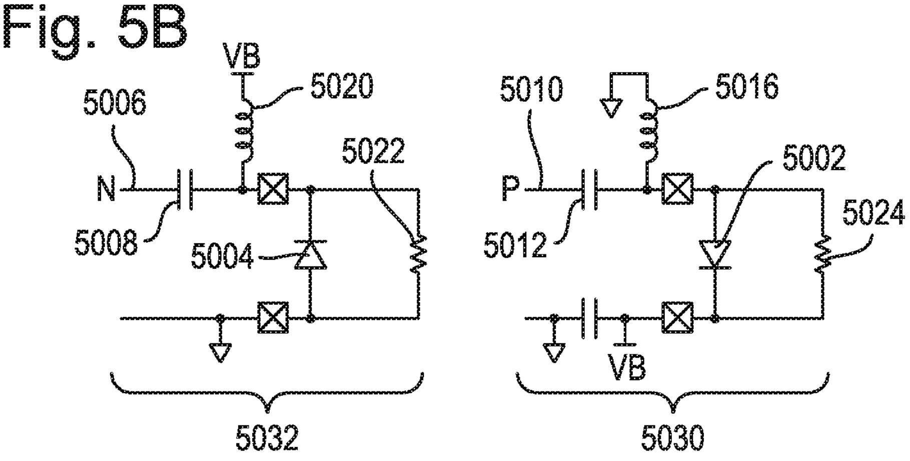

FIG. 5*b* shows an alternative to the FIG. 5*a* arrangement in two parts 5030 and 5032, the first part comprising the p-contact the first EAM portion 5002 connected to Vin 5006 via the first capacitor 5008 and the n-contact of the second EAM portion 5004 being connected to −Vin 5010 via the second capacitor 5012. The first part 5030 and second part 5032 EAM are in parallel with one another. In this example the EAM portions 5002, 5004 may be made from two different waveguides, rather than one. Vbias is applied to the n-contact for each EAM portion. The circuit may include resistors 5022 and 5024 and capacitors as shown in order to enable the circuit to conform to the required operating parameters. First and second inductors 5016 and 5020 are provided where the design parameters provide the for these elements to be used.

Figure 5C:
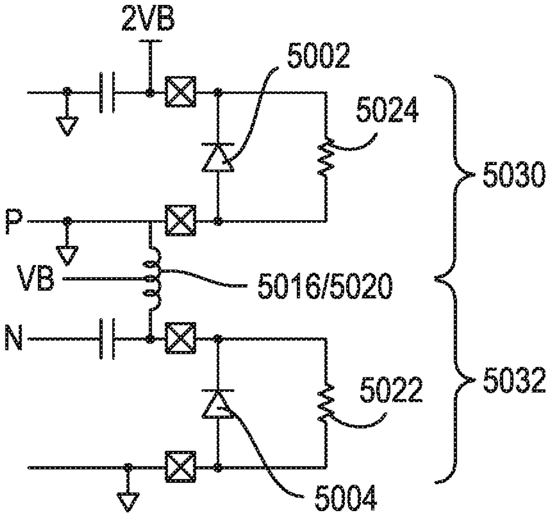

FIG. 5*c* shows a hybrid example including a combination of the previous arrangements, having first part 5030 and second part 5032 stacked on top of one another as in FIG. 5*a*. In this example the bias voltage application is different with 2Vbias being applied at the n-contact of the first EAM portion and Vbias being applied to the p-contact of the first EAM portion and to the n-contact of the second portion. Inductors are included each connection of Vbias and no inductor is used on the 2Vbias connection.

Figure 5D:
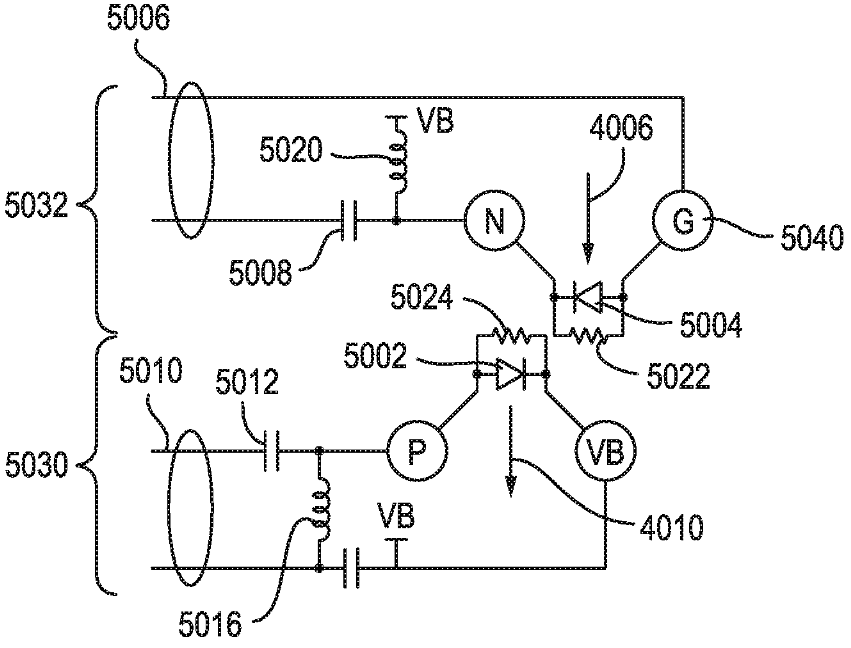

A still further example is shown in FIG. 5*d*. In addition to the same or similar components and elements being used as in the FIGS. 5*a* to 5*c*, this arrangement includes an optional gain element 5040 on one part of the EAM arrangement.

FIGS. 6*a* to 6*d* show alternative and similar configurations as respective ones of FIGS. 5*a* to 5*d* without the inductors.

Figure 6A:
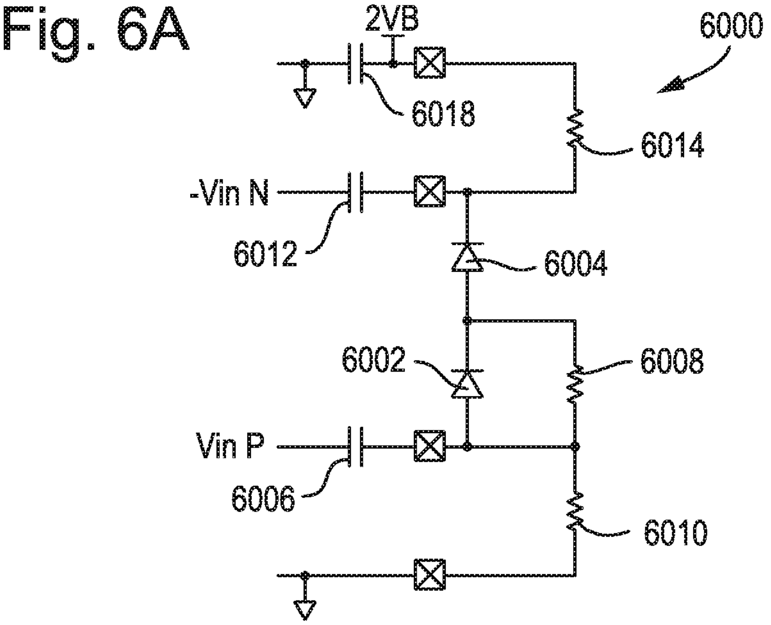
FIG. 6*a* to FIG. 6*d* shows certain alternative configurations of the EML in the FIG. 5*a* to FIG. 5*d*.

FIG. 6*a* includes a stacked EAM arrangement 6000 of a first EAM portion 6002 and a second EAM portion 6004. The first EAM portion is connected to Vin via a capacitor 6006 and further to ground (Vgrd) as shown. There are two resistors 6008 and 6010 one across Vin and Vgrd and the second 6010 across the EAM portion 6002. The second EAM portion 6004 is connected to a bias voltages (2Vbias: due to the stacked arrangement) and to −Vin via a capacitor 6012. A resistor 6014 is connected between these two voltages. 2Vbias is connected to resistor 6014 and ground via capacitor 6018. Stacked EAMs may be connected in series; the EAMs may alternatively comprise a multi-section EAM structure forming a cascaded series junction. In each case, the EAM portions are electrically and optically in series along the waveguide.

Figure 6B:
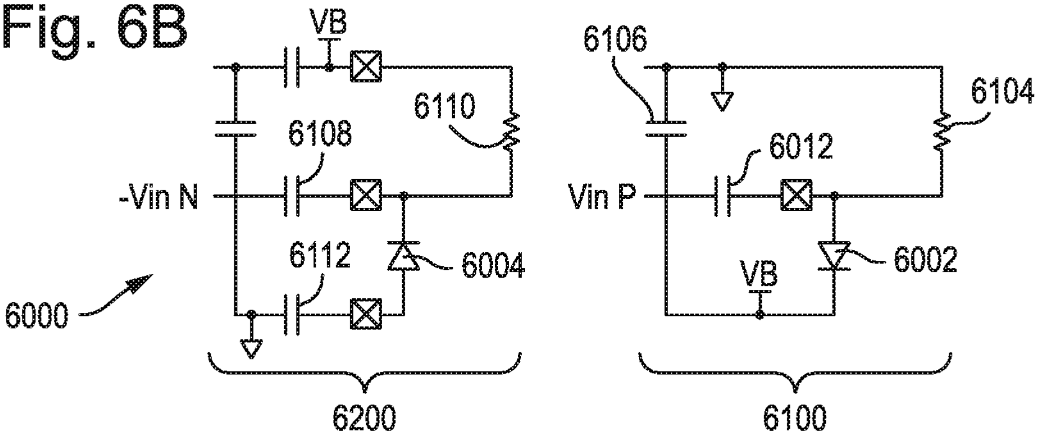

FIG. 6*b* shows a variation of the FIG. 5*b* example. This shows an EAM arrangement 6000 including first and second parts 6100 and 6200. Each part includes a PIN waveguide structure as previously described, one of which is arranged schematically as p-up and the other as n-up. This can be achieved in the optical sense or in an electrical sense by managing the manner in which the same orientation of EAM is electrically connected. The present invention envisages both possibilities. The first part 6100 includes a first EAM portion 6002 connected to Vbias at the n-contact and Vin at the p-contact via a capacitor 6102. The p-contact is also connected to Vgrd via resistor 6104. A further capacitor 6106 is provided between Vin and Vgrd. The second part 6200 includes a second EAM portion 6004 which receives −Vin at the n-contact via a capacitor 6108. Vbias is also connected to the n-contact via resistor 6110. The p-contact is connected to Vgrd via a further capacitor 6112. The two parts 6100 and 6200 may be reversed relative to one another. This arrangement gives rise to a structure which creates in phase attenuation from out of phase (e.g. 180°) differential signals.

Figure 6C:
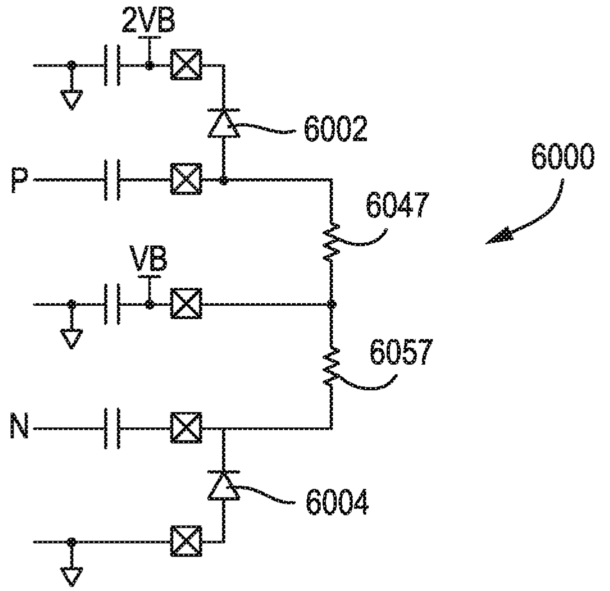

FIG. 6*c* shows a further EAM arrangement 6000 which is a hybrid of FIG. 6*a* and FIG. 6*b*. The first part 6100 is reversed and connected to a common Vbias as the second EAM portion 6004. Other elements have equivalent reference numbers and are not further described being essentially equivalent to those in FIG. 6*b*. It is further noted that functionally the circuits provide a similar result that in phase attenuation is caused from the application of out of phase differential signals.

Figure 6D:
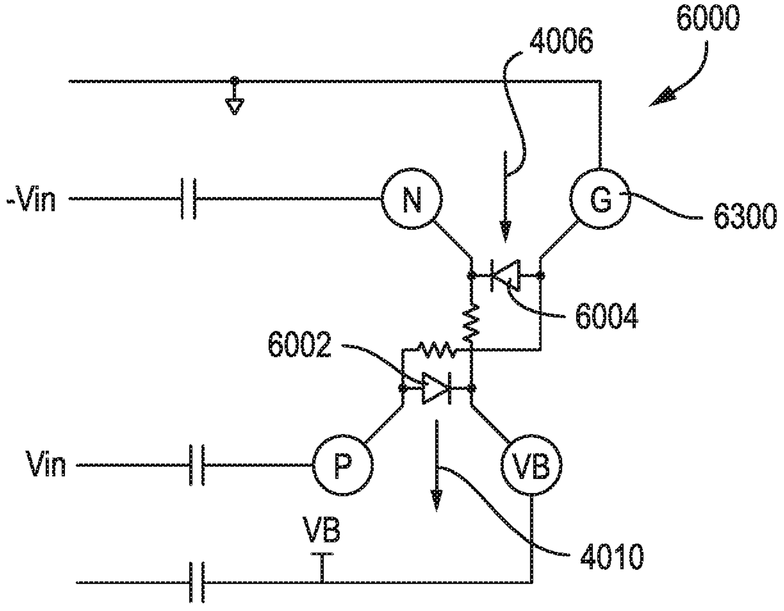

FIG. 6D is an example similar to FIG. 5D with the inductor removed and which serves as an extension of this design. As in FIG. 5D this example include a gain element 6300 which serves to restore any electrical asymmetry which may occur in the circuit.

A common figure of merit for a transmitter is the achievable frequency cut-off or bandwidth which is governed by the resistances (or impedances) and capacitances of the modulator circuit. Generally speaking, the achievable frequency is proportional to the inverse of RC as in the following:

$$F_{rc} \propto \frac{1}{RC} \quad (1)$$

Figure 7A:
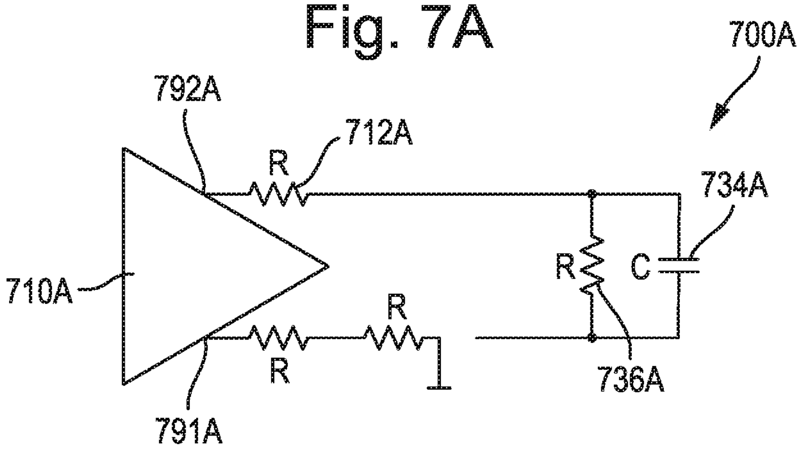
FIG. 7A is a schematic block diagram illustrating a circuit equivalent to that of FIG. 1A (and of FIG. 1B) for determining a corresponding bandwidth figure of merit.
Figure 7B:
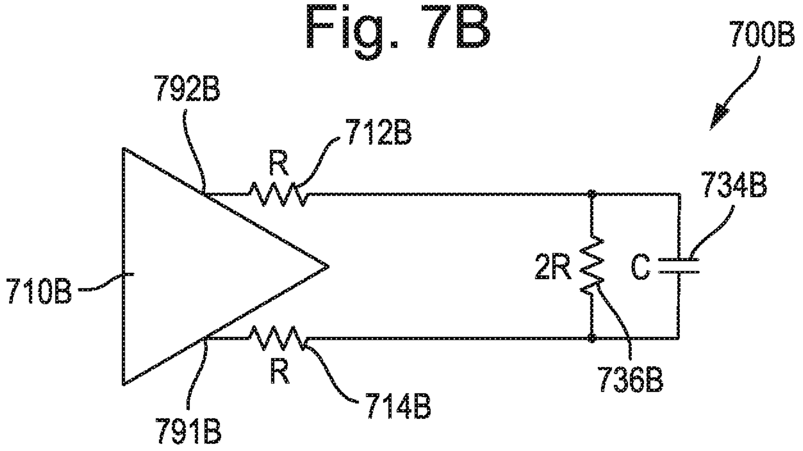
FIG. 7B is a schematic block diagram illustrating a circuit equivalent to that of FIG. 2 for determining a corresponding bandwidth figure of merit.
Figure 7C:
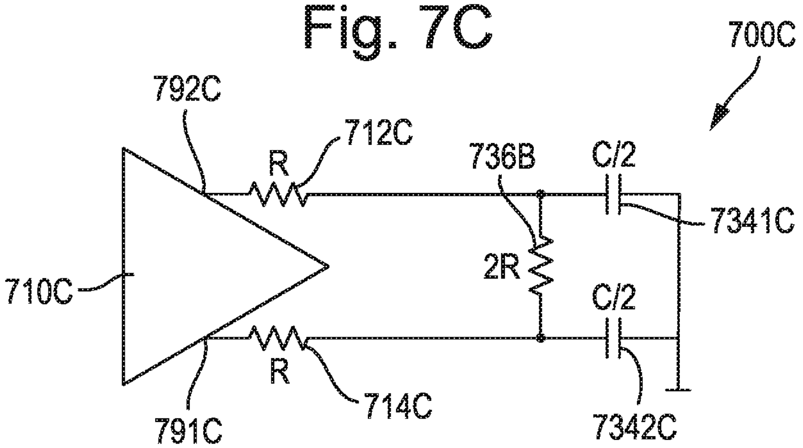
FIG. 7C is a schematic block diagram illustrating a circuit equivalent to that of FIG. 3 to FIG. 6*d* for determining a corresponding bandwidth figure of merit.

With reference also to FIGS. 7A, 7B, and 7C this highest achievable bandwidth figure of merit for the configurations respectively of FIGS. 1A and 1B, 2, and 3 will now briefly be discussed.

The effective circuit 700A depicted in FIG. 7A is equivalent to the configurations of FIGS. 1A and 1B. For ease of description the explanation which follows will refer only explicitly to FIG. 1A. The signal driver 710A corresponds to the signal driver 110A and the output 792A corresponds to the first output of the signal driver 110A, whereas 791A corresponds to the second output of signal driver 110A. The resistor R 712A corresponds to a resistance associated with the first output of the signal driver 110A which is represented by the resistor R 712A being shown in proximity to the first output 792A of the signal driver 710A. The resistor R 736A corresponds to the resistor 136A of FIG. 1A and has the same resistance as that of the resistor R 712A, while the capacitance C 734A corresponds to the capacitance of the EAM 134A of FIG. 1A. For the purposes of equation (1), R appears to the capacitance C 734A as two parallel resistances R in series with it, hence R=R/2, and C is simply C, resulting a comparative value for 1/RC equal to 2/RC.

The effective circuit 700B depicted in FIG. 7B is equivalent to the configuration of FIG. 2, wherein the signal driver 710B corresponds to the signal driver 2100 of FIG. 2 and the output 792B corresponds to the first output of the signal driver 2100, whereas 791B corresponds to the second output of signal driver 2100. The resistors R 712B and R 714B correspond to resistances associated with the first and second outputs of the signal driver 2100 which is represented by both being shown in proximity to the outputs of the signal driver 710B. The resistor R 736B corresponds to the resistors 2361 and 2362 of FIG. 2 and has a value of 2R, i.e. twice that of R 712B, while the capacitance C 734B corresponds to the capacitance of the EAM 2340 of FIG. 2. For the purposes of equation (1), R appears to the capacitance C 734B as two resistances (2R) in parallel, hence R=R, and C is simply C, resulting in a comparative value for 1/RC equal to 1/RC. Since 1/RC for the effective circuit 700B of FIG. 7B is half that for the effective circuit 700A of FIG. 7A, the configuration illustrated in FIG. 2 has a highest achievable bandwidth which is half that of the configuration illustrated in FIGS. 1A and 1B.

The effective circuit 700C depicted in FIG. 7C is equivalent to the configuration of FIG. 3, wherein the signal driver 710C corresponds to the signal driver 3100 of FIG. 3 and the output 792C corresponds to the first output of the signal driver 3100 of FIG. 3, and 791C corresponds to the second output of the signal driver 3100. The resistors R 712C and R 714C correspond to resistances associated with the first and second outputs of the signal driver 3100 which is represented by both being shown in proximity to the outputs of the signal driver 710C. The resistor R 736C corresponds to the termination resistors 3361 and 3362 of FIG. 3 and has a value of 2R, i.e. twice that of R 712C. The capacitances C/2 7341C and C/2 7342C correspond respectively to the capacitances of the first and second EAM portions 3341, 3342 of FIG. 3. The two EAM portions (not shown), each of capacitance C/2, are capable of together imparting the same modulation as a single EAM of capacitance C, each EAM portion of capacitance C/2 being generally half the size i.e. having half the length of the single EAM of capacitance C. For the purposes of equation (1), R is equal to R, which is the same as that for equivalent circuit 700B of FIG. 7B. Since the capacitance of each EAM portion of FIG. 3 is half that of the EAM of FIG. 2, and each portion is coupled to virtual ground, the total capacitance is one quarter of that of equivalent circuit 700B or C=C/4. The comparative value for 1/RC therefore is 4/RC. This shows that the configuration of FIG. 3 has a highest achievable bandwidth four times that of the configuration of FIG. 2. Moreover, this is twice that of the configurations of FIGS. 1A and 1B, all while maintaining all the other benefits mentioned hereinabove.

It will be appreciated that the examples shown in FIGS. 4 to 6 are similar in function to that of FIG. 3 and accordingly the effective circuit of any of these examples will be similar to that in FIG. 7*c*.

Figure 8:
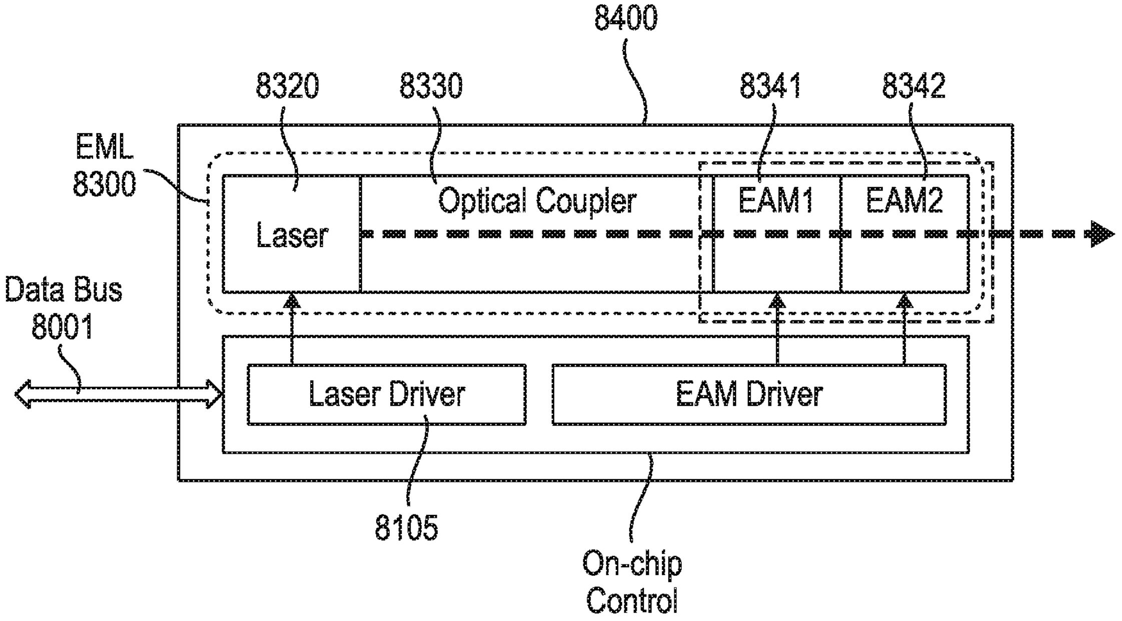
FIG. 8 is a schematic block diagram illustrating a system employing a dual modulator according to an embodiment.

Illustrated in FIG. 8 is an integrated system or transmitter 8000 including an EML 8300 or an EAM 8400 configured to receive an optical output from one of an on-chip laser forming part of an electro-absorption modulated laser (EML), another modulator, an off-chip optical source and a fiber bearing an optical input from elsewhere and on-chip control 8100 for driving the EML 8200 according to an embodiment. The integrated system may be in the form of a transmitter in a communication system such as a high-speed communication system such as CWDM for high-speed data interconnects, 5G network communications, et al. The combination of a transmitter including a driver and bias circuit and an EAM as defined herein are intended to be encompassed within the scope of the appended claims. The communication system may comprise one or more transmitters and a plurality of receivers for receiving the modulated output from the transmitter after transmission through a fiber. The communications system as defined herein is intended to be encompassed within the scope of the appended claims.

The EML 5300 includes a laser (e.g. DFB laser) 8320 for generating a continuous wave optical signal which is coupled via a coupler 5330 (e.g. tapered vertical coupler) to a dual modulator or EAM 8400 including a first EAM portion EAM1 8401 and a second EAM portion EAM2 8402, each of which is responsible for contributing to a final total modulation of the modulated optical signal emitted from the output port 8301. In accordance with communications over the data bus 8001 from a larger transmitter and/or receiver system in which the system 8000 is implemented, the on-chip control 8100 drives the laser 8320 with a laser driver 8105 and drives the first and second EAM portions EAM1 8401 EAM2 8402 with an EAM driver 8110 corresponding to the signal driver illustrated above. It is possible that the laser source is not included on chip as shown but is external thereto (the second variation is not shown). In this example the laser on chip will not be present and the source of an input optical signal is configured in a different manner. For example, one of an on-chip laser forming part of an electro-absorption modulated laser (EML), another modulator, an off-chip optical source and a fiber bearing an optical input from elsewhere.

It should be understood that although FIG. 8 illustrates an optical coupler 8330 between the laser 8320 and the dual EAM modulator portions 8401, 8402, in some embodiments no optical coupler is present or required.

Although the above embodiments illustrate an EAM or dual EAM as part of an EML, it should be understood that the placement of the modulator in proximity with the laser is optional, and in some embodiments, the EAM or dual EAM portions are not located on an EML and/or modulate light originating at a laser which is not in close proximity, i.e. external to the integrated chip package in which the EAM or dual EAM is integrated. It should be understood that although a high frequency capacitor is shown as coupled between Vbias and ground in both FIGS. 2 and 3, in some embodiments, said capacitor is optional as mentioned hereinabove.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

According to a first aspect, there is provided an electro-photonic integrated circuit comprising: a first electro-absorption modulator (EAM) portion optically coupled to the laser; a second EAM portion optically coupled to the first EAM portion; and a signal driver having a first output coupled to a first electrode of the first EAM portion and a second output coupled to a first electrode of the second EAM portion, a second electrode of the first EAM portion coupled to a first reference voltage, a second electrode of the second EAM portion coupled to a second reference voltage different from the first reference voltage, wherein the first electrode of the first EAM portion and the second electrode of the second EAM portion are either both anodes or both cathodes, and wherein the signal driver is configured to output a first signal over the first output and a second signal over the second output, the first signal and the second signal time varying inversely with respect to each other about a third reference voltage between the first and second reference voltages.

In some aspects, the third reference voltage is halfway between the first reference voltage and the second reference voltage.

In some aspects, the first EAM portion and the second EAM portion provide in phase amounts of optical absorption of optical signals passing therethrough in response to the first and second signals from the signal driver.

In some aspects, the first EAM portion and the second EAM portion provide substantially the same amount of optical absorption of optical signals passing therethrough in response to the application of substantially the same voltage difference.

In some aspects, the first EAM portion and the second EAM portion provide differing amounts of optical absorption of optical signals passing therethrough in response to the application of substantially the same voltage difference.

In some aspects, wherein optical signals from the laser pass through the first EAM portion prior to passing through the second EAM portion, and wherein the electro-photonic integrated circuit further comprises at least one delay element coupled between the second output of the signal driver and the first electrode of the second EAM portion.

In some aspects, the delay imparted by the at least one delay element corresponds to a propagation delay between the optical signals from the laser being modulated by the first EAM portion and subsequently being modulated by the second EAM portion.

Some aspects further provide for a high frequency capacitor coupled across the first and second reference voltages.

Some aspects further provide for at least one resistor coupled between the first electrode of the first EAM portion and the first electrode of the second EAM portion.

In some aspects, the signal driver and the first and second EAM portions are formed in the same integrated chip.

In some aspects, the laser and the first and second EAM portions are formed in an integrated electro-absorption modulated laser (EML).

In some aspects, the EML further comprises a high frequency capacitor coupled across the first and second reference voltages.

In some aspects, the EML further comprises at least one resistor coupled between the first electrode of the first EAM portion and the first electrode of the second EAM portion.

According to a further aspect there is provided an electro-photonic integrated circuit comprising: an electro-absorption modulator optically coupled to the laser; and a signal driver having a first output coupled via a first capacitor to a first electrode of the EAM and a second output coupled via a second capacitor to a second electrode of the EAM, the first electrode of the EAM coupled via a first resistor to a first reference voltage, a second electrode of the EAM coupled via a second resistor to a second reference voltage different from the first reference voltage, and wherein the signal driver is configured to output a first signal over the first output and a second signal over the second output, the first signal and the second signal time varying inversely with respect to each other.

In some aspects, the first resistor and the second resistor are formed within the EML.

What is claimed is:

1. An electro-photonic integrated circuit comprising:
an electro-absorption modulator (EAM); and
a signal driver and bias circuit;
wherein the EAM comprises a first EAM portion configured for generating a first modulated optical output signal from an optical input signal; and a second EAM portion configured to be optically coupled to the first EAM portion and configured to receive the first modulated optical output signal and output a second modulated output signal;
wherein the first EAM portion and second EAM portion are each configured to receive a respective substantially out of phase differential signal, from the signal driver and bias circuit, to generate substantially in-phase modulation in the EAM.

2. The electro-photonic integrated circuit of claim 1, wherein the first EAM portion is configured to provide a first modulation to the optical input signal and the second EAM portion is configured to provide a second modulation to the modulated optical output signal to generate the second modulated output signal having the first modulation and second modulation.

3. The electro-photonic integrated circuit of claim 1, wherein the optical input signal is provided by one of an on-chip laser forming part of an electro-absorption modulated laser (EML), another modulator, an off-chip optical source and a fiber bearing an optical input from an off-chip location.

4. The electro-photonic integrated circuit of claim 1, wherein each of the first EAM portion or the second EAM portion is provided with a bias voltage which provides an operating point for absorption in the EAM portion.

5. The electro-photonic integrated circuit of claim 4, wherein the bias voltage is provided on one of a p-contact or an n-contact of each of the first EAM portion and the second EAM portion and the respective out of phase differential signal is provided on an opposite contact of each respective ones of the first EAM portion and the second EAM portion.

6. The electro-photonic integrated circuit of claim 1, wherein the first EAM portion comprises a first PIN waveguide structure and the second EAM portion comprises a second PIN waveguide structure, one of which is arranged as p-up and the other as n-up.

7. The electro-photonic integrated circuit of claim 6, wherein the first EAM portion connected to a first reference voltage (Vbias) at an n-contact; and to an input voltage (Vin) via a capacitor and to a second reference voltage (Vgrd) via a resistor at a p-contact.

8. The electro-photonic integrated circuit of claim 6, further comprising a second capacitor between an input voltage (Vin) and a second reference voltage.

9. The electro-photonic integrated circuit of claim 6, wherein the second EAM portion is connected at an n-contact to an input voltage (Vin) via a third capacitor and a first reference voltage via a second resistor; at a p-contact is connected to second reference voltage via a fourth capacitor.

10. The electro-photonic integrated circuit of claim 1, wherein the first EAM portion and the second EAM portion are arranged in series relative to an input voltage (Vin).

11. The electro-photonic integrated circuit of claim 1, wherein the first EAM portion and the second EAM portion are arranged in parallel relative to an input voltage (Vin).

12. The electro-photonic integrated circuit of claim 1, further including a gain element to restore electrical asymmetry.

13. The electro-photonic integrated circuit of claim 1, wherein the first EAM portion and the second EAM portion are configured to have substantially a same length.

14. The electro-photonic integrated circuit of claim 1, wherein the first EAM portion and the second EAM portion are configured to receive substantially a same value of an input voltage (Vin), one positive and one negative.

15. The electro-photonic integrated circuit of claim 1, wherein an input voltage (Vin) and a second input voltage (-Vin) are respectively applied across the first EAM portion and the second EAM portion.

16. The electro-photonic integrated circuit of claim 1, wherein an input voltage (Vin) and a second input voltage (-Vin) comprise time-varying modulation signals for the respective first EAM portion and second EAM portion.

17. The electro-photonic integrated circuit of claim 1, further comprising a delay element to configure a propagation delay of optical signals between modulation thereof in the first EAM portion and subsequent modulation thereof in the second EAM portion to equalize outputs therefrom.

18. The electro-photonic integrated circuit of claim 1, further comprising a high frequency (HF) capacitor coupled between a first and a second reference voltage to provide a local source of charge to mitigate edge current.

19. The electro-photonic integrated circuit of claim 1, wherein the electro- absorption modulator (EAM); and the signal driver and bias circuit are monolithically integrated on a single chip.

20. The electro-photonic integrated circuit of claim 19, wherein the single chip comprises a plurality of epitaxial stack formed horizontally over one another.

21. The electro-photonic integrated circuit of claim 19, further comprising connection to an optical fiber for onward transmission.

22. A driver arrangement for driving an electro-absorption modulator (EAM) comprising a first EAM portion and a second EAM portion wherein the drive arrangement comprises a driver and a bias circuit configured to output a respective substantially out of phase differential signal to each EAM portion to cause the first and second EAM portions to generate a substantially in-phase modulation.

23. The driver arrangement of claim 22, wherein providing a bias voltage from the driver arrangement to each EAM portion which provides an operating point for absorption in the EAM portion.

24. The driver arrangement of claim 23, wherein the bias voltage is provided on one of a p-contact or an n-contact of each of the first EAM portion and the second EAM portion and the respective out of phase differential signal is provided on an opposite contact of each respective one of the first EAM portion and the second EAM portion.

25. An electro-absorption modulator (EAM) comprising a first EAM portion configured to receive an optical input signal and output a first modulated optical output signal;

and a second EAM portion configured to be optically coupled to the first EAM portion and configured receive the first modulated optical output signal and to output a second modulated optical output signal;

wherein the first EAM portion and second EAM portion are configured to receive a respective out of phase differential signal which is biased to produce in-phase modulation from a driver arrangement according to claim 23.

26. The EAM of claim 25 wherein the first EAM portion is configured to provide a first modulation to the optical signal and the second EAM portion is configured to provide a second modulation to the first modulated output to generate the modulated output having the first modulation and second modulation.

27. The electro-photonic integrated circuit of claim 1, wherein the first EAM portion is connected to a first input voltage (Vin) via a first capacitor and to ground (Vgrd), and comprises a first resistor across the first input voltage and a second resistor between ground and the first EAM portion; and wherein the second EAM portion is connected to a bias voltage (2Vbias) and to a second input voltage (-Vin) via a second capacitor and a third resistor is connected between the bias voltage and to the second input voltage; the bias voltages is connected to fourth resistor and to ground via a third capacitor.

28. A transmitter comprising the electro-photonic integrated circuit of claim 1.

29. An optical communication system comprising one or more transmitter as claimed in claim 28 and a plurality of receivers configured to receive a modulated optical output from the one or more transmitters via a plurality of fibers or other couplers.

* * * * *